Nov. 5, 1963   R. C. SCHNECKLOTH   3,109,640
WORK-HANDLING APPARATUS
Filed Nov. 9, 1960   3 Sheets-Sheet 2
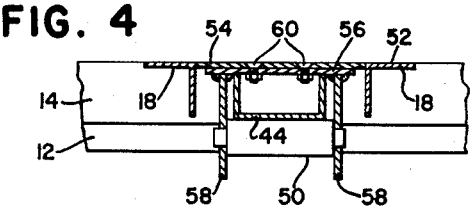
FIG. 4
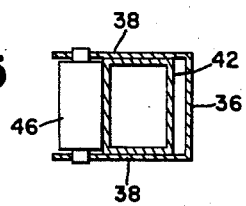
FIG. 5
FIG. 6
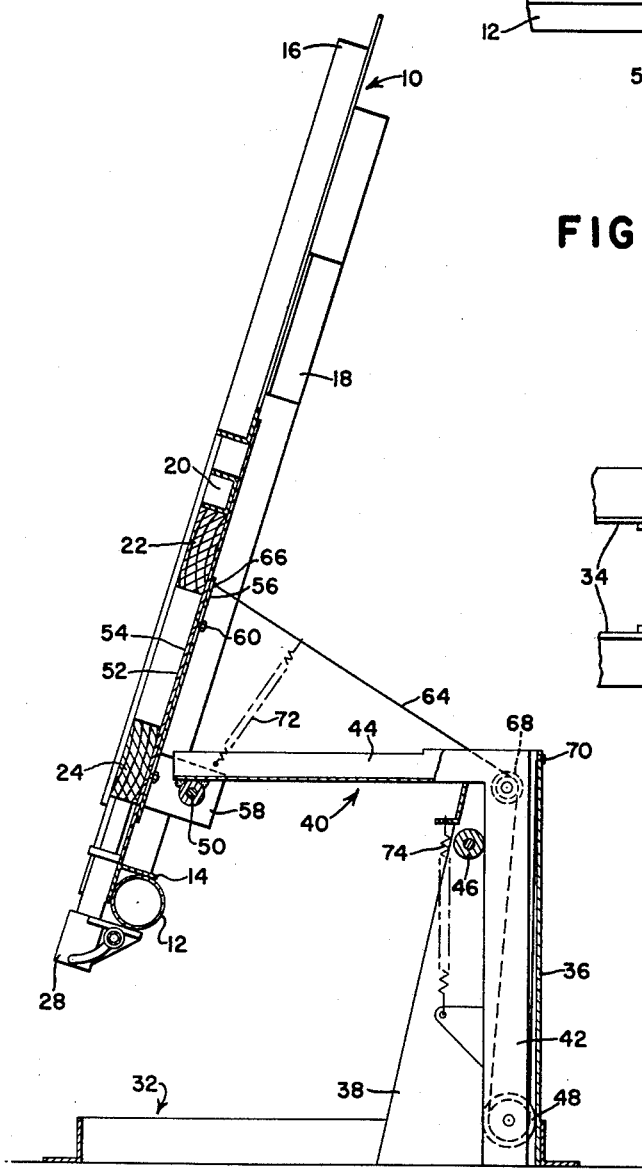
FIG. 3
INVENTOR.
R. C. SCHNECKLOTH
BY
ATTORNEY

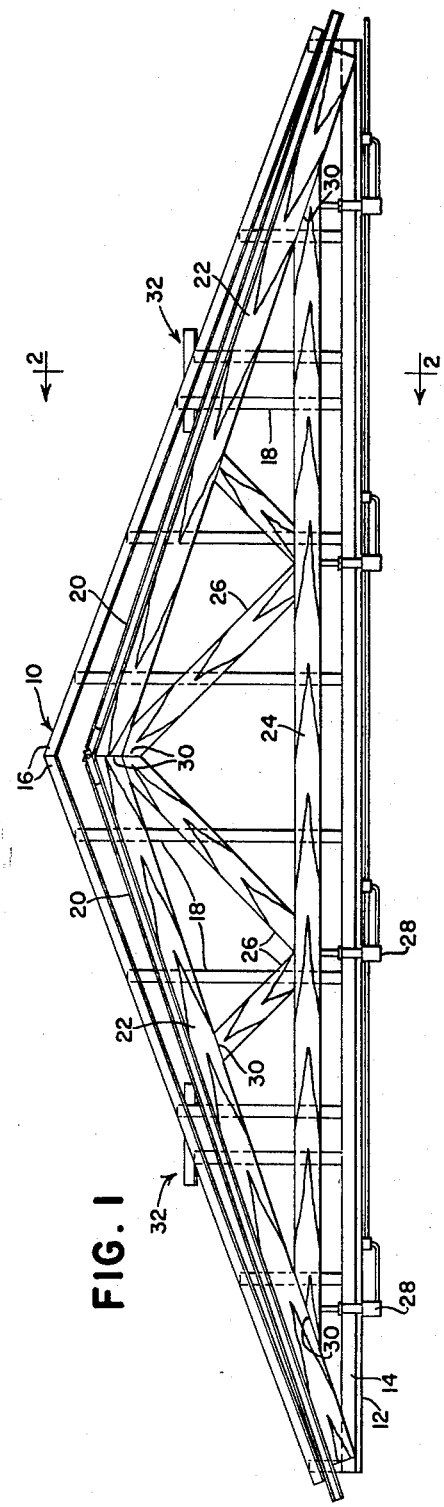
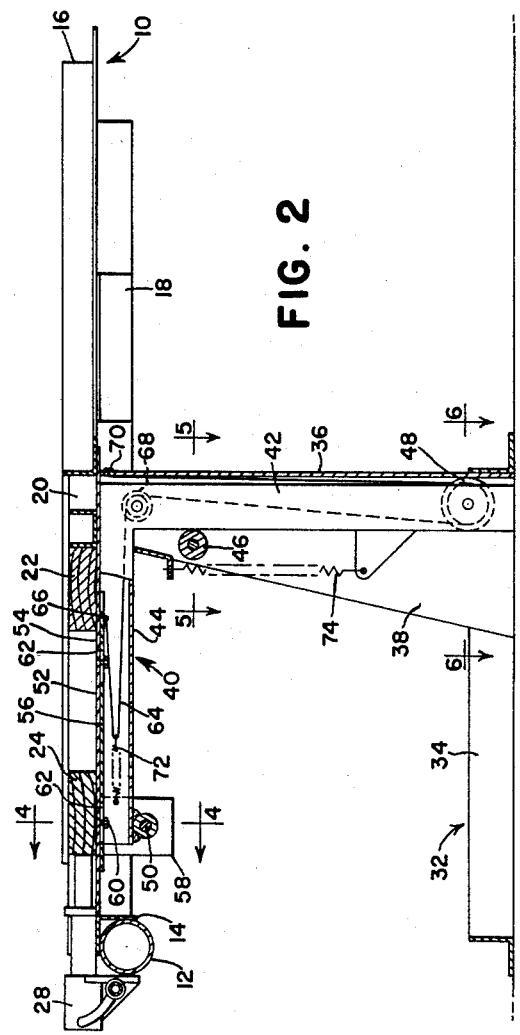

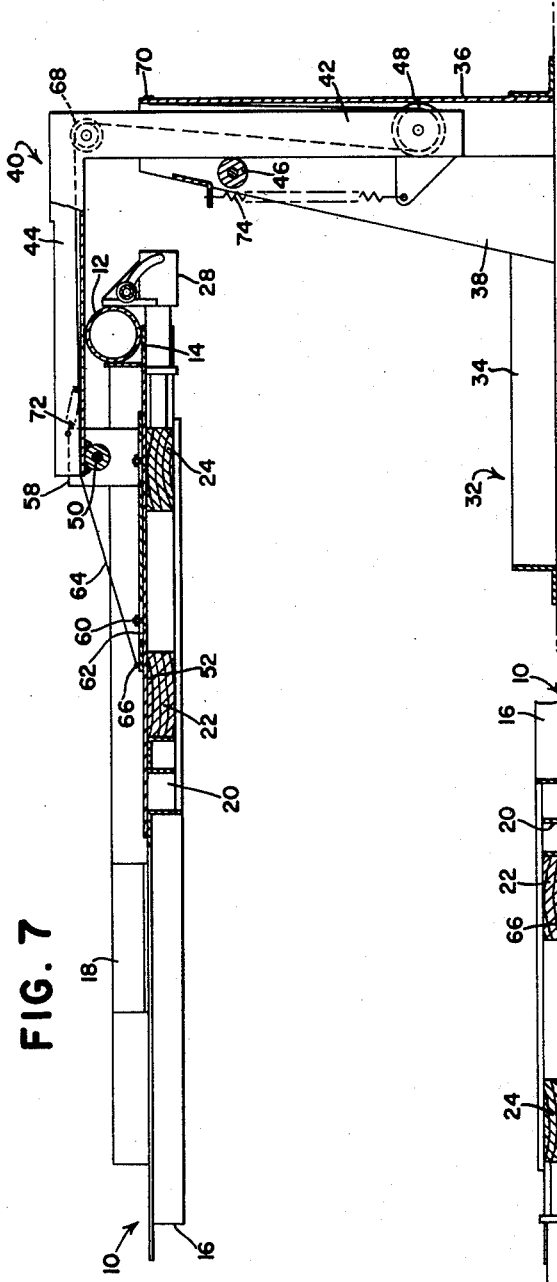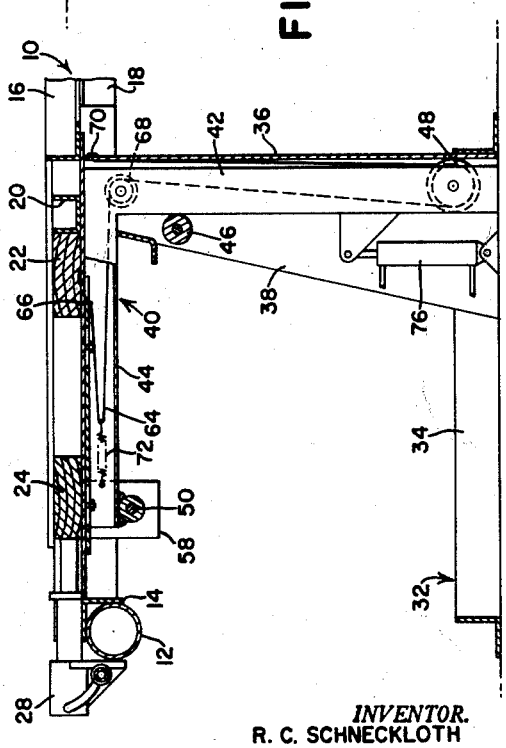

United States Patent Office 3,109,640
Patented Nov. 5, 1963

3,109,640
WORK-HANDLING APPARATUS
Raymond C. Schneckloth, R.R. 3, Clinton, Iowa
Filed Nov. 9, 1960, Ser. No. 68,247
15 Claims. (Cl. 269—73)

This invention relates to a work-handling apparatus and more particularly to such apparatus involving a work-supporting element or its equivalent which is capable of occupying several positions incident to the processing of work or material handled thereby.

The invention finds particular utility in, but is not limited to, the field of assemblying structural components such as roof trusses, panels, etc., wherein the processing involves the treatment of the component from both sides. For example, in the assembling of a roof truss, or the like, an initially horizontally positioned table element supports the several members going to make up the truss and the upper side of the truss as thus established has manually applied thereto a plurality of fasteners at the several joints. In the past, it has been the practice to make provision for pivoting of the table to an upright position so that the workmen could apply similar fasteners to the back of the truss. According to the present invention, the former apparatus is improved by mounting the table for pivoting through a range of substantially 180° so that the table or jig, and the work carried thereon, can be inverted so that what was once the undersurface of the truss etc. is now the upper surface. The invention features the retention of an intermediate generally upright position, which may be used for unloading the finished work product from the table. It is a significant object of the invention to provide means whereby the inverted table and work carried thereby will occupy the same general level as that occupied by it in its initial position. In this respect, the invention provides for the use of a pivot which is offset below the work surface, which means that when the work surface is inverted, it will be offset below the pivot; however, the invention utilizes mechanism for elevating the initial support of the work surface so that when it is inverted an elevation occurs to accommodate or compensate for the downward offset of the surface relative to the pivot. Other objects of the invention reside in means for properly distributing the weight of the element and the work carried thereby, the provision of improved force-transmitting means which makes elevation of the carrier or support a function of the swinging of the element to its inverted position, the position of power-operated means for elevating the carrier or support, and such other features and characteristics as will become apparent from the following detailed description of a preferred embodiment of the invention illustrated, by way of example, in the accompanying drawings, the figures of which are described below.

FIGURE 1 is a plan view of a typical truss-assembling apparatus.

FIGURE 2 is an enlarged section as seen along the line 2—2 of FIGURE 1, showing the apparatus in its initial position.

FIGURE 3 illustrates the apparatus in a tilted or generally upright position.

FIGURE 4 is an enlarged section on the line 4—4 of FIGURE 2.

FIGURE 5 is an enlarged section on the line 5—5 of FIGURE 2.

FIGURE 6 is an enlarged section on the line 6—6 of FIGURE 2.

FIGURE 7 is a view similar to FIGURES 2 and 3 but showing the work-supporting element in its inverted position.

FIGURE 8 is a fragmentary sectional view, generally similar to FIGURE 2, but showing a modified form of the invention in which power-operated means is utilized to elevate the carrier for the work-supporting element.

As already indicated, the invention is not limited to the precise details illustrated herein, but in view of its commercial adaptation to apparatus for handling roof trusses, the disclosure will proceed along those lines.

The basic part of the apparatus comprises a table-like element or work-handling means, here in the form of a generally triangular frame 10 which will hereinafter be referred to as a table. This frame is made up of an elongated tubular backbone 12 to which is rigidly welded a similarly elongated angle iron 14. These two members form what may be regarded as the base of the triangle, and the triangle is completed by the addition thereto of its two sides, made up by frame members 16. A plurality of members normal to the members 12—14 are rigidly secured between the angle 14 and the members 16. These are shown at 18.

A pair of additional frame members 20 is shown here as providing a pair of angularly related stops or abutments for accommodating a roof truss of a certain pitch. If the truss had a different pitch, the frame member 16, being angle irons having upright flanges, would serve. A truss is assembled on this apparatus by initially pisitioning the table 10 in a horizontal position as shown in FIGURE 2 and placing thereon a pair of rafter members 22, an elongated chord 24 and a plurality of struts or braces 26. The members 12—14 carry thereon a plurality of force-exerting means, here in the form of pneumatic cylinders 28, connected in parallel so that the force exerted thereby is transmitted to the chord 24 which in turn compresses the struts 26 against the rafter members 22, much in the manner of a vise. With the truss members so retained, fasteners are applied at the several joints, as in the areas indicated by the numerals 30. These may be easily applied by workmen standing adjacent to the apparatus which, having the position of FIGURE 2, represents substantially a table. When the fasteners are applied to what may be regarded as the top surface, the table 10 may be swung through approximately 180° to an inverted position as shown in FIGURE 7. At this time, similar fasteners may be applied to the opposite side of the truss in areas opposite to those indicated at 30.

For the purpose of mounting the table 10 for the multi-positioning thereof, the apparatus includes base means, here shown as having a pair of bases 32, each of which has a pair of members 34 transverse to the long dimension of the table 10, and each of which has rigidly secured to its members 34 an upright member 36 in the form of a forwardly facing channel, the word "forwardly" being used with reference to the members 12 and 14 of the table as being at the front of the apparatus. Thus, each base 32 is in the form of a reversed L and the structure is further rigidified by the provision of a pair of rigidly attached webs 38.

Each base 32 has associated therewith a carrier 40, which is here in the form of an inverted reversed L having a vertical leg or portion 42 and an upper horizontal supporting leg, arm or portion 44. The vertical leg 42 is preferably of box-like section and the arm 44 is preferably in the form of a channel. The leg 42 is vertically receivable by the upright part 36 of the base 32 and thus this part may be regarded as a track in which the carrier leg 42 is guided. An upper roller 46 is carried by a shaft in the upper portions of the webs 38 and the front edge or face of the leg 42 bears against this roller. The lower end of the leg 42 is guided relative to the back wall of the base part 36 by means of a sheave 48 which functions also as a roller. Thus, the arm 44 is in overhanging relation to the associated members 34 of the respective base, and the terminal end thereof carries a pivot 50 on an axis which is horizontal and which parallels the length of the table members 12 and 14.

In the initial position of the table 10 as shown in FIGURE 2, it may be regarded as having an upper surface 52 on which the truss members 22, 24 and 26 are received. It will be noted that the axis of the pivot 50 is offset below the surface 52 (FIGURE 2). The table 10 is mounted on the pivots 50, at each base 32, by means to be presently described. For each mount, the associated portion of the table carries a horizontal plate 54 welded to the associated parallel angles 18 (FIGURE 4). Below this plate is carried the structure including another plate 56 which has rigidly secured thereto as by welding a pair of depending ears 58. The structure 56—58 is adjustable relative to the table, in a direction normal to the length of the members 12 and 14, by the provision of recessed bolts 16 received in slots 62 in the plate 56 and in countersunk apertures in the plate 54. The purpose of this adjustment is to enable proper location of the pivot axis 50 relative to the total weight of the table 10 and the work carried thereon. The weight of the table 10 relative to the axis of the pivots 50 is such that the weight is substantially counterbalanced when the table 10 is in a generally upright position, which is represented in FIGURE 3. Although this position is not upright in a strict sense, adjustment of the pivot 50 relative to the weight of the table will provide for any selected position generally in the area indicated. Because of the weight distribution, it is relatively easy to swing the table from the FIGURE 2 position through the position of FIGURE 3 to the inverted position of FIGURE 7. Likewise, the table may be temporarily held in the position of FIGURE 3, as for unloading the completed truss or whatever work is carried by an equivalent table. And, because of the vertical offset between the axis of the pivots 50 and the surface 52, the weight distribution will change as the weight passes overcenter when the table is swung from the position of FIGURE 3 to that of FIGURE 7. In the FIGURE 2 position, the table overlies the carrier 40, resting on the upper portion of the arm 44 to maintain its generally horizontal position. In the inverted position of FIGURE 7, the underside of the tubular member 12 contacts the undersurface of the arm 44 of the carrier 40 to again obtain a generally horizontal position. However, in view of the vertical offset between the pivot axis at 50 and the surface at 52, the surface at 52 would be offset below the axis of the pivot and if no provision were made for elevating the pivot, the surface 52 would be at a level lower than that occupied by that surface in FIGURE 2.

But, this discrepancy is compensated for according to the present invention by the provision of mechanism operative on the carrier to elevate same in an amount generally equal to twice the vertical offset between the pivot axis at 50 and the surface at 52. In that form of the invention shown in FIGURES 1 through 7, this mechanism includes force-transmitting means operative in response to swinging of the table from its FIGURE 2 position to its FIGURE 7 position, elevation of the carrier being accommodated by the guiding means established by the roller 46 and the combined roller and sheave 48. To obtain the necessary force for activating the mechanism, a cable 64 has one end thereof anchored at 66 to the mounting structure 56—58. Since this structure is carried by the table 10, the cable 64 is in effect anchored to the table. The cable 64 extends rearwardly and is passed over a sheave 68 journaled in the upper rear corner of the carrier 40. The cable passes thence downwardly and is trained around the combined sheave and roller 48 and is brought back up to a second anchor or dead end to the upper part of the base upright 36, as shown at 70. When the table is in its FIGURE 2 position, a slight amount of slack is provided in the cable by means of a relatively light tension spring 72, thus providing the necessary lost motion so that the mechanism is activated in the change in position from FIGURE 3 to FIGURE 7. The slack portion of the cable is appropriately nested in the channel section of the carrier arm 44.

As the table 10 is swung from the position of FIGURE 2 to that of FIGURE 3, the cable 64 is tightened, stretching the spring 72. As previously described, the weight of the table and the work carried thereby is substantially counterbalanced at this point. However, because of the vertical offset between the axis of the pivots at 50 and the surface 52, the weight will pass over center as the table 10 is swung forwardly beyond the position of FIGURE 4, at which time the table will easily swing to the inverted position of FIGURE 7. As it does so, it exerts a tensional force through the cable 64, causing the carrier 40 to elevate to compensate for the vertical offset between the pivot axis 50 and the surface 52. In other words, the surface 52 in FIGURE 7 is at substantially the same level occupied thereby in FIGURE 2. The friction involved, together with the weight distribution as already described, makes the apparatus easily functioning and despite the considerable weight, it may be readily changed among its several positions. An assist spring 74 is connected between the upright part of the base 32 and a lower part of the upright leg 42 of the carrier 40 to assist upward movement of the carrier in the change between its FIGURE 2 and FIGURE 7 positions. As the table is swung back from its FIGURE 7 to its FIGURE 2 position, passing through its FIGURE 3 position as it does, the cable 64 is relaxed and the weight of the table combined with that of the carrier 40 tends to restore the carrier to its initial or down position, and the tension spring 72 again nests the slack portion of the table 64 as described above.

In that form of the invention shown in FIGURE 8, a power-operated means, such as a fluid cylinder 76 is connected between the base 32 and the carrier 40, and the cylinder may be used in conjunction with the cable mechanism, in substitution for the spring 74, or may be utilized without the cable mechanism as a still further modification of the invention. In either form of the invention or any variation thereof, it is a significant feature that the cable mechanism acts as a check against swinging of the table from the FIGURE 3 position to the FIGURE 7 position as the greater portion of the weight of the table passes over-center as respects the pivot axis.

It will be readily seen from the foregoing that the apparatus is relatively simply constructed, especially in view of its versatility and the ability thereof to occupy the several positions noted. Other forms of mechanism may be employed to elevate the carrier and the carrier may be constructed in a manner other than that illustrated. Likewise, the particular apparatus disclosed should be regarded as only representative of many fields in which the basic features of the invention could be employed. Characteristics and objects of the invention other than those categorically enumerated will readily occur to those versed in the art, all without departure from the spirit and scope of the invention.

What is claimed is:

1. Apparatus of the class described, comprising: a base; a carrier having an upper support including a generally horizontal pivot spaced above the base; means mounting the carrier on the base for elevation from and downward return to a down position; work-supporting means having a top surface upwardly offset from said pivot to occupy a normal position at a certain level when the carrier is in its down position, said work-supporting means having holding means for mounting work on said surface and said work-supporting means further having a depending mounting portion connected to said pivot to mount the work-supporting means for swinging through substantially 180° to an inverted position in which said surface is offset below the pivot to thereby invert the work; and mechanism connected to the carrier and operative to elevate said carrier from its down position in an amount substantially equal to twice the offset between said pivot and said surface so that when the work-supporting means is swung to its inverted position said surface will occupy substantially the same level occupied thereby in its aforesaid normal position, and said work-supporting means having a through opening therein in addition to said holding means for enabling access through said surface to the inverted work.

2. Apparatus of the class described, comprising: a base; a carrier having an upper support including a generally horizontal pivot spaced above the base; means mounting the carrier on the base for elevation from and downward return to a down position; work-supporting means having a top surface upwardly offset from said pivot to occupy a normal position at a certain level when the carrier is in its down position, said work-supporting means having holding means for mounting work on said surface and said work-supporting means further having a depending mounting portion connected to said pivot to mount the work-supporting means for swinging through substantially 180° to an inverted position in which said surface is offset below the pivot to thereby invert the work; and mechanism connected among the base, the carrier and the work-supporting means and including force-transmitting means energized by swinging of the work-supporting means and acting on the carrier and reacting on the base for elevating said carrier from its down position in an amount substantially equal to twice the offset between said pivot and said surface so that when the work-supporting means is swung to its inverted position said surface will occupy substantially the same level occupied thereby in its aforesaid normal position, and said work-supporting means having a through opening therein in addition to said holding means for enabling access through said surface to the inverted work.

3. The invention defined in claim 2, including: spring means connected between the base and carrier and operative to act upwardly on the carrier to assist said force-transmitting means in elevating the carrier.

4. The invention defined in claim 2 in which: the work-supporting means extends in opposite directions generally horizontally from the pivot to dispose lesser and greater portions of the weight thereof at opposite sides of said pivot, and said surface being adapted to mount work generally coextensively thereof, said weight portions being so related to each other and to the pivot as to substantially counterbalance each other when the work-supporting means, with the work thereon, is in an intermediate position just short of approximately 90° from said normal position, and the portion of greater weight being disposed to pass over-center as respects the pivot when swung from said intermediate position to said inverted position so as to assist said force-transmitting means in the elevation of the carrier.

5. The invention defined in claim 4, including: spring means connected between the base and carrier and operative to act upwardly on the carrier to further assist said force-transmitting means in elevating the carrier.

6. Apparatus of the class described, comprising: a base; a carrier having an upper support including a generally horizontal pivot spaced above the base; means mounting the carrier on the base for vertical movement between first and second positions; work-supporting means having a surface offset vertically in one direction from said pivot to occupy a normal position at a certain level when the carrier is in its first position, said work-supporting means having holding means for mounting work on said surface and said work-supporting means further having a mounting portion connected to said pivot to mount the work-supporting means for swinging through substantially 180° to an inverted position in which said surface is offset vertically in the opposite direction from the pivot to thereby invert the work; and mechanism connected to the carrier and operative to move said carrier to its second position in an amount substantially equal to twice the offset between said pivot and said surface so that when the work-supporting means is swung to its inverted position said surface will occupy substantially the same level occupied thereby in its aforesaid normal position, and said work-supporting means having a through opening therein in addition to said holding means for enabling access through said surface to the inverted work.

7. The invention defined in claim 6, in which: said mechanism includes a power-operated device connected between the base and carrier.

8. The invention defined in claim 6, in which: said mechanism includes force-transmitting means connected to the carrier and to and deriving power from movement of the work-supporting means toward its inverted position.

9. The invention defined in claim 8, in which: the force-transmitting means includes a lost-motion connection interconnected among the base, carrier and work-supporting means for enabling substantial swinging of the work-supporting means toward its inverted position without activating said mechanism, whereby to delay movement of the carrier out of its first position.

10. The invention defined in claim 6, in which: said mechanism includes a first guide element on the carrier at a lower portion thereof, a second guide element on the carrier at an upper portion thereof, and a flexible element having a first anchor at one end to an upper part of the base, passed downwardly under the first guide element, upwardly over the second guide element and extended thence to the work-supporting means and having a second anchor at its other end to the work-supporting means in spaced relation to the pivot.

11. The invention defined in claim 10, in which: the base has an upright track part, and said first guide element is rotatably carried by the carrier and rides said track part.

12. Apparatus of the class described, comprising: an upright support; a carrier in the form of an inverted L having a vertical leg and a horizontal leg having a transverse horizontal pivot at its free end; means mounting the carrier on the support via said vertical leg for vertical movement and including cooperating guide portions in said support and said vertical leg to enable elevation of the carrier from and downward return to a down position; work-supporting means having a top surface upwardly offset from said pivot to occupy a normal position at a certain level when the carrier is in its down position, said work-supporting means having holding means for mounting work on said surface and said work-supporting means further having a depending mounting portion connected to said pivot to mount the work-supporting means for swinging through substantially 180° to an inverted position in which said surface is offset below the pivot to thereby invert the work; and mechanism connected to the carrier and operative to elevate said carrier from its down position in an amount substantially equal to twice the offset between said pivot and said surface so that when the work-supporting means is swung to its inverted position said surface will occupy substantially the same level occupied thereby in its aforesaid normal position, and said work-supporting means having a through opening therein in addition to said holding means for enabling access through said surface to the inverted work.

13. Apparatus of the class described, comprising: a table-like work-receiving element having an initial generally horizontal position and presenting a top surface at a certain level; a base below the element; a carrier mounting the element on the base and including means mounting said carrier on said base for elevation from a down position when the element is initially positioned as aforesaid and further including pivot means on a horizontal axis mounting the element for swinging through substantially 180° to an inverted position in which said surface faces downwardly, said element also having an intermediate position between said initial and inverted positions and said axis being so located that the weight of the aforesaid element is substantially balanced at both sides of the axis when the aforesaid element is in said intermediate position so that the element may be overbalanced respectively to opposite sides of said intermediate position to assume said initial and inverted positions, said axis being further offset below said surface in the initial position of the aforesaid element and offset above said surface in the inverted position of said element; and mechanism connected to the carrier and operative to elevate said carrier from its down position in an amount substantially equal to twice the offset between said pivot and said surface so that when the aforesaid element is swung to its inverted position said surface will occupy substantially the same level occupied thereby in its initial position, said element having a through opening therein in addition to said work-holding means for enabling downward access through said surface to the inverted work.

14. The invention defined in claim 13, in which: said mechanism includes force-transmitting means connected between the element and the carrier and actuated by the element during swinging thereof from its intermediate position to its inverted position.

15. Apparatus of the class described, comprising: a base; a carrier having an upper support including a generally horizontal pivot spaced above the base; means mounting the carrier on the base for elevation from and downward return to a down position; work-supporting means having a top surface upwardly offset from said pivot to occupy a normal position at a certain level when the carrier is in its down position, said work-supporting means having holding means for mounting work on said surface and said work-supporting means further having a depending mounting portion connected to said pivot to mount the work-supporting means for swinging through substantially 180° to an inverted position in which said surface is offset below the pivot to thereby invert the work; and mechanism connected to the carrier and work-supporting means and operative automatically in response to inversion of the work-supporting means to elevate the carrier in an amount compensatory of said offset to dispose said surface in the inverted position of said work-supporting means at substantially the level occupied by said surface in its said normal position, and said work-supporting means having a through opening therein in addition to said holding means for enabling access through said surface to the inverted work.

References Cited in the file of this patent

UNITED STATES PATENTS

| | | |
|---|---|---|
| 1,371,868 | De Baecker | Mar. 15, 1921 |
| 2,386,925 | Beck | Oct. 16, 1945 |
| 2,388,987 | Morrison | Nov. 13, 1945 |
| 2,498,161 | Hamilton | Feb. 21, 1950 |
| 2,828,870 | Corley | Apr. 1, 1958 |
| 2,835,964 | Yarwood | May 27, 1958 |